United States Patent [19]

Hansen

[11] 4,455,152

[45] Jun. 19, 1984

[54] HYDROGEN GENERATOR

[76] Inventor: Jens R. Hansen, P.O. Box 20517, Portland, Oreg. 97220

[21] Appl. No.: 468,852

[22] Filed: Feb. 22, 1983

[51] Int. Cl.³ .............................................. B01J 7/00
[52] U.S. Cl. ....................................... 48/61; 48/65; 123/3; 123/DIG. 12; 422/198; 422/199; 422/211
[58] Field of Search ...................... 422/198, 199, 211; 48/61, 65; 423/657, 658; 110/229; 432/156, 158; 123/1 A, 3, DIG. 12, 25 P

[56] References Cited

U.S. PATENT DOCUMENTS 1,099,446  6/1914  Jaubert ................................ 423/658

FOREIGN PATENT DOCUMENTS 462531  3/1937  United Kingdom ................ 422/199

*Primary Examiner*—Peter F. Kratz
*Assistant Examiner*—Joye L. Woodard
*Attorney, Agent, or Firm*—Williamson, Bains, Moore & Hansen

[57] ABSTRACT

A hydrogen generator decomposes water into hydrogen and oxygen, and includes an induction coil which is electrically heated to a temperature sufficient to decompose water passing therethrough. A generator coil is connected in communicating relation to the induction coil, and is positioned in a fire resistant crucible containing ferrous oxide pellets. Oxygen and hydrogen produced by decomposition of water pass through the ferrous oxide pellets where the oxygen reacts with the ferrous oxide and the hydrogen is burned to produce heat for heating a building, such as a conventional home.

4 Claims, 2 Drawing Figures 4,455,152

HYDROGEN GENERATOR

SUMMARY OF THE INVENTION

This invention relates to a hydrogen generator which produces hydrogen from the decomposition of water. There are a number of prior art hydrogen generators in which water is used as an essential component in the production of hydrogen. For example, U.S. Pat. No. 3,291,572 discloses a hydrogen generator wherein hydrogen is produced from lithium hydride and steam. In U.S. Pat. No. 4,009,006 water is decomposed by passing a fine water spray through electrically heated copper screens positioned within an insulating chamber. The hydrogen is then used as a combustion gas in an internal combustion engine. Other prior art devices decompose water by passing heated water through steel wool.

The present hydrogen generator is arranged and constructed to efficiently and inexpensively produce hydrogen from the decomposition of water.

It is therefore a general object of this invention to provide a hydrogen generator, of simple and inexpensive construction, which produces gaseous hydrogen by passing water through an electrically heated induction coil and a heated generator coil from which the hydrogen gas is liberated.

A more specific object of this invention is to provide a hydrogen generator in which water is decomposed as it passes through heated induction and generator coils, and hydrogen is separated from the oxygen which is catalyzed by ferrous oxide pellets in a generating crucible.

These and other objects and advantages of my invention will appear more fully from the following description made in conjunction with the accompanying drawings wherein like reference characters refer to the same or similar parts throughout the several views.

FIGURES OF THE DRAWING

PREFERRED EMBODIMENT OF THE INVENTION

Figure 1:
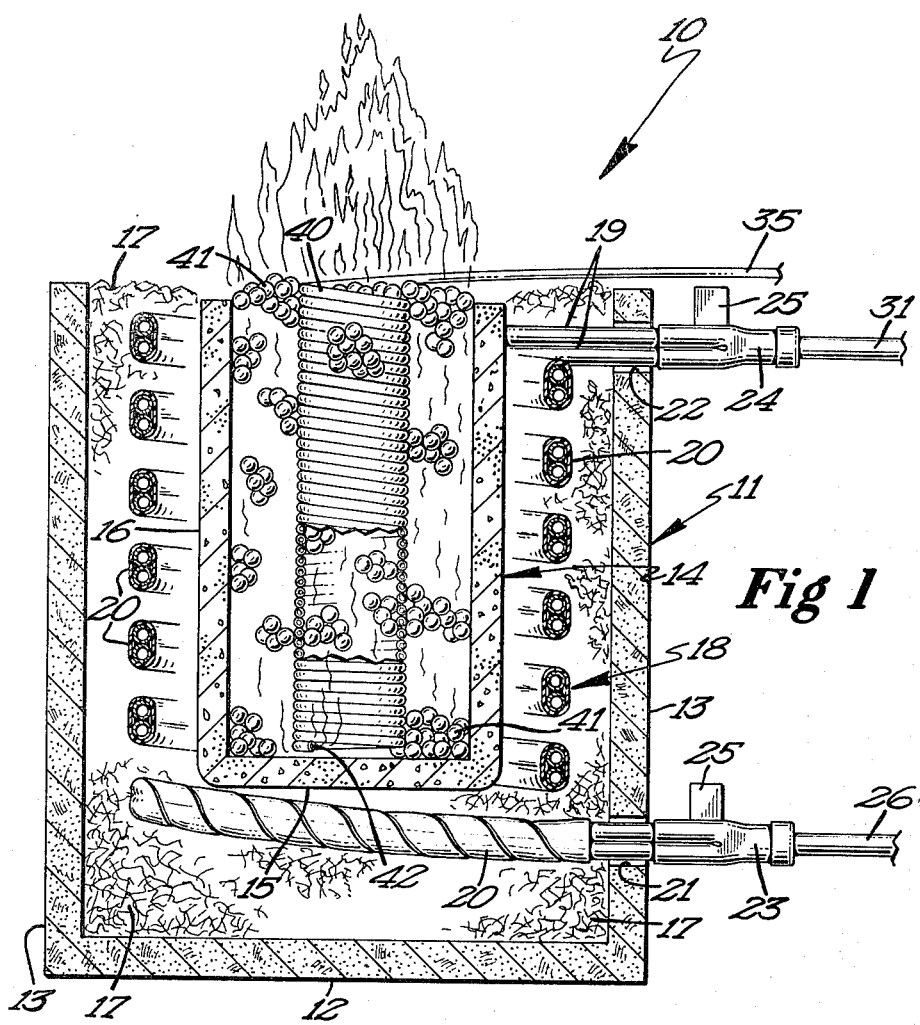
FIG. 1 is a cross-sectional view of the hydrogen generator.

Referring now to FIG. 1, it will be seen that the hydrogen generator, designated generally by the reference numeral 10, is thereshown. The hydrogen generator includes a housing 11 which is of generally rectangular configuration and which includes a bottom wall 12 and upstanding, generally rectangular side walls 13. The housing has an open top and is formed of transite, which is composed of asbestos and cement. Thus, the housing 11 is formed of heat resistant material.

A generally cylindrical, open-topped crucible 14 is positioned within the housing 11 and is comprised of a substantially flat bottom wall 15 and upstanding, continual cylindrical walls 16. The crucible is formed of heat resistant ceramic material and is designed to withstand temperatures upwardly of 4,000° Farenheit. Mineral wool 17 is positioned within the housing 11 to insulate the crucible 14 from the housing 11.

The hydrogen generator 10 also includes a cylindrically-shaped induction coil 18 which is positioned exteriorly of the crucible. In the embodiment shown, the induction coil is formed from a pair of ⅜ inch copper tubings, each of which is approximately 25 feet in length. It is pointed out that the induction coil has an inside diameter of approximately 9 inches. The copper tubes are joined together, as best seen in FIG. 1, and are covered with a suitable insulating material 20. Mineral wool also insulates the induction coil from the housing.

The housing 11 has an opening 21 in one side wall adjacent the lower end portion thereof and an opening 22 in the same side wall adjacent the upper end portion thereof. The induction coil 18 includes an outlet end portion which projects through the opening 21 and has an inlet end portion 23 which projects through the opening 22 of the housing 11. It will also be noted that the inlet end portion and the outlet end portion each have a pair of power tabs 25 secured to the copper tubing and projecting therefrom.

Figure 2:
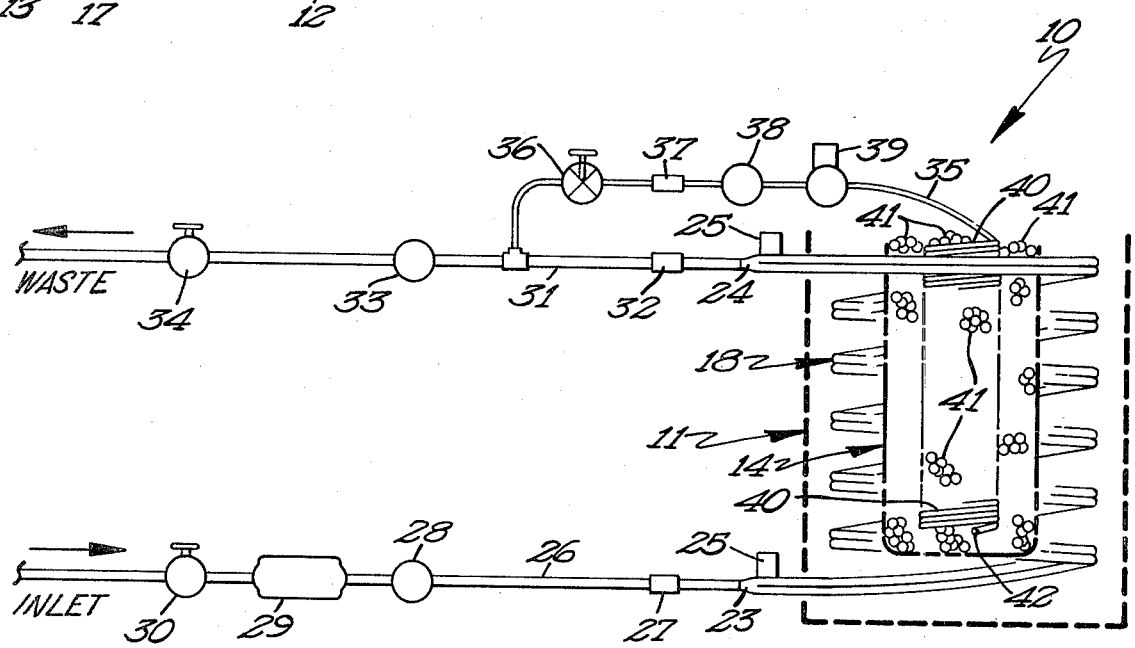
FIG. 2 is a diagrammatic view illustrating all of the components of the hydrogen generator.

Referring now to FIG. 2, it will be seen that the inlet end portion 23 is connected to a supply line 26 by a coupling union 27. The coupling union may be formed of a dielectric or electrically non-conducting material such as nylon or the like. The supply line 26 is connected to a source of water under pressure and the supply line is provided with a conventional pressure release valve 28. The supply line is also provided with a strainer 29 which mechanically removes impurities from the water. A suitable manually operated control valve 30 is located upstream of the strainer 29 in the supply line 26.

The outlet end portion 24 of the induction coil 18 is connected to an outlet line 31 by coupling union 32. The outlet line 31 is also provided with a temperature regulation valve 33 and a manually operated control valve 34 located downstream of the temperature regulator valve 33. Waste gases and water are exhausted through the exhaust line 31.

The exhaust line 31 also has a conduit 35 connected in communicating relation therewith upstream of the temperature regulator valve 33. The conduit 35 is provided with a needle valve 36. A coupling union 37 connects the conduit 35 to a generator coil which is positioned interiorly of the crucible 14. A pressure relief valve 38 is positioned downstream of the needle valve but upstream of a solenoid control valve 39. The solenoid valve 39 controls the supply of fluid to the generator coil 40. In the embodiment shown, the generator coil 40 is formed of stainless steel tubing ¼ inch in diameter and 30 feet in length. The inside diameter of the coil is approximately 2 inches. The crucible 14 is also filled with ferrous oxide or taconite pellets. The generator coil 40 has an outlet 42 located at its lower end and adjacent the bottom wall 15 of the crucible 14.

The power tabs 25 are connected by electrical conductors 26 to a source of electrical current. In the embodiment shown, the induction coil is connected to a 50 horsepower 400 cycle generator so that high voltage can be supplied to the induction coil.

In operation, water will be introduced through the supply line and the solenoid valve will be opened to supply a stream of water to the generator coil. Thereafter, the induction coil will be energized by electrical current from the generator until the coil heats to approximately 1,250° Farenheit. Heating is continued until the water is decomposed into its constituent gases, hydrogen and oxygen. It is important to maintain the pH of the water at 7, and it is preferred that the water flow at approximately 2 to 3 pounds per hour. Gaseous oxygen and hydrogen are liberated through the outlet 42 at the lower end portion of the generator coil. The oxygen will readily react with the ferrous oxide pellets, and the hydrogen will pass upwardly through the ferrous oxide pellets. The hydrogen gas may be ignited and may function to supply heat for a conventional home. Heating for the conventional home will only require approximately 2 to 3 pound flow per hour, although this may vary with larger size areas to be heated. It is also pointed out that as the hydrogen is burned, the contents of the crucible 14, including the generator coil, will become progressively heated so that the electrical energy used to heat the induction coil may be substantially reduced. With this arrangement, the hydrogen generator becomes highly efficient in its operation.

From the foregoing, it will be seen that I have provided a novel hydrogen generator which may be used as a means of supplying heat to buildings and the like, including conventional homes. It will also be noted that the present hydrogen generator is not only of simple and inexpensive construction, but one which operates in a more efficient manner than any heretofore comparable hydrogen generator.

While the preferred embodiments of the present invention have been described, it should be understood that various changes, adaptions and modifications may be made therein without departing from the spirit of the invention and the scope of the appended claims.

What is claimed is:

1. A hydrogen generator, comprising:
    a housing formed of a heat resistant material; an open-topped crucible formed of a heat resistant material and positioned interiorly of said housing, said crucible containing particulate ferrous oxide;
    an induction coil formed of metallic tubing and positioned around the outside of said crucible, said coil having an inlet end portion connected to a source of water, and having an outlet end portion through which waste gases are exhausted;
    means electrically connected with said induction coil and to a source of electrical current whereby when electrical current flows through the induction coils, the latter will be heated to heat the water contained therein to a temperature sufficient to decompose the water into gaseous hydrogen and oxygen;
    a generator coil formed of stainless steel tubing and positioned within said crucible, said generator coil having an inlet end portion connected in communicating relation with said induction coil adjacent the outlet end portion thereof for receiving therethrough gases produced by the decomposition of water, said generator coil having an outlet end portion located interiorly of and adjacent the bottom of said crucible through which gaseous hydrogen and oxygen are discharged to flow upwardly through the particulate ferrous oxide whereby the gaseous oxygen will react with the ferrous oxide and the gaseous hydrogen may be ignited as it is discharged through the open upper end of the crucible.

2. The hydrogen generator as defined in claim 1 wherein said generator coil is formed of stainless steel.

3. The hydrogen generator as defined in claim 1 wherein said induction coil is formed of copper tubing, the latter being electrically connected to a source of electrical current whereby said tubing will be heated when energized by electrical current.

4. The hydrodgen generator as defined in claim 2 whereby said generator coil will be heated by combustion of the hydrogen gas to a temperature sufficient to decompose water in the generator coil and thereby substantially reduce the electrical energy needed to heat the induction coil.

* * * * *